United States Patent
Nakamura et al.

(10) Patent No.: US 10,585,404 B2
(45) Date of Patent: Mar. 10, 2020

(54) MACHINING TIME-ESTIMATING METHOD FOR WIRE ELECTRICAL DISCHARGE MACHINE AND CONTROL DEVICE FOR WIRE ELECTRICAL DISCHARGE MACHINE

(71) Applicant: MAKINO MILLING MACHINE CO., LTD., Tokyo (JP)

(72) Inventors: Tadahiro Nakamura, Aiko-gun (JP); Yayoi Ono, Aiko-gun (JP)

(73) Assignee: MAKINO MILLING MACHINE CO., LTD., Tokyo (JP)

(*) Notice: Subject to any disclaimer, the term of this patent is extended or adjusted under 35 U.S.C. 154(b) by 142 days.

(21) Appl. No.: 15/577,184

(22) PCT Filed: May 29, 2015

(86) PCT No.: PCT/JP2015/065651
§ 371 (c)(1),
(2) Date: Nov. 27, 2017

(87) PCT Pub. No.: WO2016/194072
PCT Pub. Date: Dec. 8, 2016

(65) Prior Publication Data
US 2018/0088543 A1 Mar. 29, 2018

(51) Int. Cl.
*G05B 13/02* (2006.01)
*B23H 7/20* (2006.01)
(Continued)

(52) U.S. Cl.
CPC .......... *G05B 13/026* (2013.01); *B23H 1/02* (2013.01); *B23H 7/04* (2013.01); *B23H 7/20* (2013.01);
(Continued)

(58) Field of Classification Search
None
See application file for complete search history.

(56) References Cited

U.S. PATENT DOCUMENTS

| 4,550,375 A | * | 10/1985 | Sato | B23Q 41/00 |
| | | | | 318/569 |
| 5,514,941 A | * | 5/1996 | Kita | B23H 7/04 |
| | | | | 318/569 |
| 2010/0187204 A1 | | 7/2010 | Angelella et al. | |

FOREIGN PATENT DOCUMENTS

| CN | 103197634 A | 7/2013 |
| EP | 0 649 698 | 4/1995 |

(Continued)

OTHER PUBLICATIONS

International Search Report dated Aug. 11, 2015 directed to PCT Application No. PCT/JP2015/065651; 2 pages.

*Primary Examiner* — Kenneth M Lo
*Assistant Examiner* — Istiaque Ahmed
(74) *Attorney, Agent, or Firm* — Morrison & Foerster LLP

(57) ABSTRACT

A machining time-estimating method for a wire electrical discharge machine for estimating the remaining machining time (Tr) during the machining of a workpiece comprises: a step for setting a predicted machining velocity; a step for determining the actual machining velocity; a step for determining an estimated machining velocity so as to incorporate the predicted machining velocity and the actual machining velocity at a specified ratio, that is, a reference ratio; and a step for calculating remaining machining time from the estimated machining velocity. By executing the actual machining velocity-determining step to the remaining machining time-calculating step repeatedly to estimate remaining machining time moment by moment, remaining wire electrical discharge machining time is estimated with reduced error.

6 Claims, 5 Drawing Sheets

(51) Int. Cl.
*B23H 1/02* (2006.01)
*B23H 7/04* (2006.01)
B23H 7/02 (2006.01)

(52) U.S. Cl.
CPC ...... *B23H 7/02* (2013.01); *G05B 2219/31407* (2013.01); *G05B 2219/45043* (2013.01)

(56) References Cited

FOREIGN PATENT DOCUMENTS

| | | | |
|---|---|---|---|
| EP | 0649698 A1 * | 4/1995 | ......... G05B 19/4063 |
| JP | 3-111125 | 5/1991 | |
| JP | 4-5316 | 1/1992 | |
| JP | 5-57530 | 3/1993 | |
| JP | 6-320344 | 11/1994 | |
| JP | 2001-157923 | 6/2001 | |
| JP | 5507024 | 3/2014 | |

* cited by examiner

MACHINING TIME-ESTIMATING METHOD FOR WIRE ELECTRICAL DISCHARGE MACHINE AND CONTROL DEVICE FOR WIRE ELECTRICAL DISCHARGE MACHINE

CROSS-REFERENCE TO RELATED APPLICATIONS

This application is a U.S. national phase patent application of International Patent Application No. PCT/JP2015/065651, filed May 29, 2015, of which is hereby incorporated by reference in the present disclosure in its entirety.

FIELD OF THE INVENTION

The present invention relates to a method of estimating the machining time of a wire electrical discharge machine and to a control device of a wire electrical discharge machine.

BACKGROUND OF THE INVENTION

When using a wire electrical discharge machine to successively machine workpieces, having the operator predict the time of end of machining on one workpiece so as quickly start to prepare for the machining of the next workpiece after the end of that machining is important for raising the operating rate of a facility.

Conventionally, the time of the end of machining in wire electrical discharge machining is predicted by using a reference machining speed provided by the machine manufacturer or by using a machining speed calculated by the user based on past actual data (hereinafter both called the "predicted machining speed"). Alternatively, to further raise the precision of estimation, as shown in PLT 1, sometimes the actual machining speed detected during machining is used for prediction of the time of end of machining in place of the predicted machining speed. In this case, the remaining machining time is displayed while being updated every instant.

PATENT LITERATURE

PLT 1: Japanese Utility Model Publication No. 04-005316U

BRIEF SUMMARY OF INVENTION

When using the predicted machining speed to estimate the machining time, due to various differences in the material, shape, and method of setting the workpiece etc., sometimes considerable error occurred between the predicted machining speed and the actual machining speed. Therefore, the precision of the estimated machining time may be insufficient. On the other hand, as shown in PLT 1, when using the actual machining time detected during machining to calculate the remaining machining time, since, in actuality, the machining is not stable for a while from the start of machining, the extent of fluctuation of the actual machining time may be large and therefore the precision of the calculated remaining machining time also became insufficient.

The present invention is made in consideration of the above situation and has as its object the provision of a method of estimating a machining time and a control device of a wire electrical discharge machine enabling estimation of the remaining machining time in wire electrical discharge machining with little error.

To solve the above problem, according to a first aspect of the present invention, there is provided a method for estimating a machining time of a wire electrical discharge machine which estimates a remaining machining time while machining a workpiece, the method comprising steps of: setting a predicted machining speed; finding an actual machining speed; and using the set predicted machining speed and the found actual machining speed by a predetermined ratio to calculate the remaining machining time.

According to this, the predicted machining speed and the actual machining speed are used in a predetermined ratio to calculate the remaining machining time, so compared with the conventional practice of using just the predicted machining speed to calculate the remaining machining time or using just the actual machining speed to calculate the remaining machining time, the precision of calculation of the remaining machining time is improved.

According to a second aspect of the present invention, there is provided a method for estimating a machining time of a wire electrical discharge machine which estimates a remaining machining time while machining a workpiece, the method comprising steps of: setting a predicted machining speed; finding an actual machining speed; determining an estimated machining speed so that the predicted machining speed and the actual machining speed are included in a specific ratio, that is, reference rates, wherein the predicted machining speed reference rate falls along with progression of the machining and the actual machining speed reference rate increases along with progression of the machining; and calculating the remaining machining time from the estimated machining speed, wherein the remaining machining time at each instant is estimated by repeatedly executing the process from the step of finding the actual machining speed to the step of calculating the remaining machining time.

According to this, the estimated machining speed is determined by lowering the actual machining speed reference rate or by just the predicted machining speed at the stage of the initial period of machining where the machining is not stable, while is determined by lowering the predicted machining speed reference rate and raising the actual machining speed reference rate along with the progress in machining, so it becomes possible to obtain a high precision estimated value of the remaining machining time at each instant at any stage during the progression of machining.

In the present invention, in the step of determining the estimated machining speed performed when machining is proceeding in a first predetermined time period right after a start of machining or in a first predetermined section of the workpiece, the predicted machining speed reference rate is made 100%, in the step of determining the estimated machining speed performed when machining is proceeding in a second predetermined time period after an elapse of the first predetermined time period or in a second predetermined section after the first predetermined section is passed, the predicted machining speed reference rate is gradually lowered and the actual machining speed reference rate is gradually raised in accordance with progression of the machining, and, in the step of determining the estimated machining speed performed when machining is proceeding in a third predetermined time period after an elapse of the second predetermined time period or in a third predetermined section after the second predetermined section is passed, a predetermined lower limit reference rate is applied for the predicted machining speed reference rate and a predetermined upper limit reference rate may be applied for the actual machining speed reference rate.

The method of estimating the machining time of a wire electrical discharge machine according to the second aspect of the present invention may further comprise a step of adjusting a length of the second predetermined time period or the second predetermined section to become shorter than a set length when a machining stability is high and to become longer than a set length when a machining stability is low.

The method of estimating the machining time of a wire electrical discharge machine according to the present invention may estimate the remaining machining time during each of a plurality of stages of machining corresponding to a plurality of types of machining conditions, all of the steps in the first or second aspect may be performed for each of the plurality of stages of machining, and the method may further comprise a step of cumulatively adding the remaining machining times of the plurality of stages of machining calculated in the step of calculating the remaining machining time.

According to this, the remaining machining time for one workpiece is calculated by cumulatively adding the remaining machining times calculated for the plurality of stages of machining, so even when machining of a single workpiece includes a plurality of stages of machining different from each other, it becomes possible to calculate the remaining machining time with a high precision.

In the present invention, in the step of finding the actual machining speed, the actual machining speed may be continuously found and, in the step of calculating the remaining machining time, the latest actual machining speed may be used.

According to a third aspect of the present invention, there is provided a control device of a wire electrical discharge machine for estimating a remaining machining time while machining a workpiece, the control device comprising a predicted machining speed storage unit, an actual machining speed calculating unit, a remaining machining time calculating unit using a predicted machining speed stored in the predicted machining speed storage unit and an actual machining speed calculated by the actual machining speed calculating unit in a predetermined ratio to calculate the remaining machining time, and a remaining machining time display unit displaying the calculated remaining machining time updated every instant.

According to a fourth aspect of the present invention, there is provided a control device of a wire electrical discharge machine for estimating a remaining machining time while machining a workpiece, the control device comprising an actual machining speed calculating unit, a remaining machining time calculating unit determining an estimated machining speed so that a predetermined predicted machining speed and the actual machining speed calculated at the actual machining speed calculating unit are included in a specific ratio, that is, reference rates and calculating the remaining machining time from the estimated machining speed, the remaining machining time calculating unit configured so that the predicted machining speed reference rate falls along with progression of the machining and the actual machining speed reference rate increases along with progression of the machining, and a remaining machining time display unit displaying the calculated remaining machining time updated every instant.

BRIEF DESCRIPTION OF DRAWINGS

Below, a method of estimating the machining time of a wire electrical discharge machine according to a first embodiment of the present invention will be explained while referring to FIGS. 1, 2, and 3. FIG. 1 is a plan view of a workpiece 200 to which the method of estimation is applied. The workpiece 200 is a horizontally long rectangular plate shape. Inside of the workpiece 200, a movement path of a wire electrode is set substantially surrounding machining parts 201, 202, and 203 at three locations for creating three members having outer contours of square shapes of approximately 10 mm sides. The movement path of the wire electrode is substantially comprised of square shapes corresponding to the shapes of the parts to be created, but extends so that parts remaining to be cut are partially formed. Note that, the parts remaining to be cut are cut off by an operation by an operator after all of the machining parts 201, 202, 203 of the three locations finish being machined. Three start holes $S_1$, $S_2$, $S_3$ are also formed in advance below the machining parts. The parts extending at a slant are unmachined parts $B_1$ and $B_2$ and show the path of the center of a head of the machine when moving to an adjoining machining part.

Figure 1:
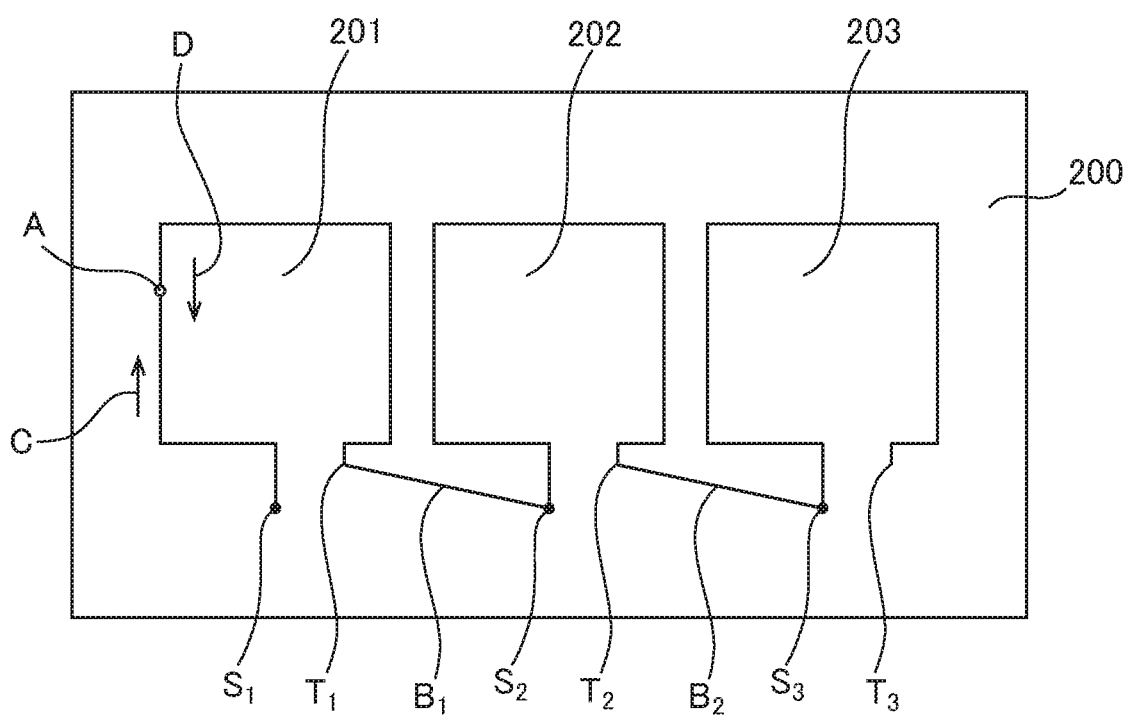
FIG. 1 is a plan view of a workpiece to which a method of estimating the machining time of a wire electrical discharge machine according to a first embodiment of the present invention is applied for machining.

In the workpiece 200 of FIG. 1, the machining parts at three locations (below, from the left side of the figure, the left machining part 201, the center machining part 202, and the right machining part 203) are respectively machined three times, that is, by first to third machining operations. The first machining, the second machining, and the third machining correspond to rough machining, semifinish machining, and finish machining in the present embodiment. The machining starts from the left machining part 201. When the first to third machining operations for the left machining part 201 end, the wire electrode is automatically cut and connected and the adjoining center machining part 202 starts to be machined. After that, the machining similarly proceeds. When the third machining of the right machining part 203 ends, one workpiece finishes being machined. The first machining of the left machining part 201 is performed under the rough machining conditions from the start hole $S_1$ in the direction of the arrow C until the turning point $T_1$, the second machining is performed under the semifinish machining conditions from the turning point $T_1$ in the direction of the arrow D until the start hole $S_1$, and the third machining is performed under the finish machining conditions from the start hole $S_1$ in the direction of the arrow C until a turning point $T_1$ wherein the left machining part 201 finishes being machined. The center machining part 202 and the right machining part 203 similarly finish being machined after moving back and forth between the start hole S2 and a turning point $T_2$ and the start hole $S_3$ and a turning point $T_3$ by one and a half strokes.

Table 1 shows the machining conditions, predicted machining speed Vp, estimated machining circumferential length Le, actual machining circumferential length La, actual machining time Ta, actual machining speed Va, remaining machining circumferential length Lr, estimated machining speed Ve, and remaining machining time Tr in the case of performing the first to third machining operations on the different machining parts of three locations of the workpiece 200 shown in FIG. 1.

In the example shown in FIG. 1 and Table 1, the state is shown where the second machining, i.e., semifinish machining, of the left machining part 201 of the workpiece 200 is performed and the wire electrode has advanced in thedirection shown by the arrow D up to the position A. The

TABLE 1

| Stage of machining | Machining conditions | Predicted machining speed Vp mm/min | Estimated machining circumferential length Le mm | Actual machining circumferential length La mm | Actual machining time Ta min | Actual machining speed Va mm/min | Remaining machining circumferential length Lr mm | Estimated machining speed Ve mm/min | Remaining machining time Tr min |
|---|---|---|---|---|---|---|---|---|---|
|  | 1051 | .100 | 28.580 | 2.860 | .284 | .820 | 5.720 | .820 | 2.569 |
|  | 1301 | 4.000 | 25.232 | 5.363 | .005 | 2.650 | 9.869 | 3.457 | .421 |
|  | 1302 | 7.000 | 24.872 |  |  |  | 24.872 | 7.000 | .345 |
|  |  |  |  | Total |  |  |  |  | 7.335 |

E1051 shown in Table 1 shows the machining conditions for rough machining, E1301 shows the conditions for semifinish machining, and E1302 shows the conditions for finish machining. These machining conditions and various corresponding machining parameters and predicted machining speeds Vp are formed into a database and stored in a control device of the wire electrical discharge machine. In this regard, the above-mentioned predicted machining speed Vp means the machining speed predicted before machining. For example, it is determined based on the actual values in similar machining in the past and values provided from an EDM machine manufacturer etc. The predicted machining speed Vp, as shown in Table 1, differs depending on the machining conditions. In rough machining, it is relatively slow, in semifinish machining, it is faster, while in finish machining, it becomes fastest. Although Table 1 shows three types of machining conditions, usually the control device stores a large number of other machining conditions as well.

When performing the method according to the embodiment of the present invention, the operator designates the machining conditions. When the machining conditions are designated, a corresponding predicted machining speed Vp and various machining parameters are set in the control device. Further, the control device calculates the estimated machining circumferential length Le from the designated machining conditions and the already supplied shape data etc. of the machining part. The estimated machining circumferential length Le also differs depending on the machining conditions. This is because the gap between the workpiece and the wire differs depending on the machining conditions.

In the method of estimation according to the first embodiment, the predicted machining speed Vp is set by designating the machining conditions, but an embodiment in which the predicted machining speed Vp is set independent of the machining conditions by input into the control device is also possible.

The control device calculates the actual machining speed Va and the remaining machining circumferential length Lr during machining based on the actual machining circumferential length La and actual machining time Ta from the start of machining. Therefore, the actual machining speed Va in the present embodiment shows the average actual machining speed Va from the start of machining to the time of calculation. This calculation is performed continuously. In the present embodiment, the speed is updated by calculation at a frequency of once every 4 seconds in the program.

center machining part 202 and the right machining part 203 are not yet machined at all.

The remaining machining time Tr is calculated from the estimated machining speed Ve and the remaining machining circumferential length Lr. In the present method of estimation, the estimated machining speed Ve is defined as including the predicted machining speed Vp and the actual machining speed Va in a specific ratio. In this Description, the ratio is called the "reference rate". This is also expressed by a percentage. If the reference rate for the actual machining speed Va is P (%), the reference rate for the predicted machining speed Vp is (100−P) (%). The estimated machining speed Ve is expressed as the following formula:

$$Ve = Vp \times (1-P/100) + Va \times P/100 \quad \text{(formula 1)}$$

Figure 2:
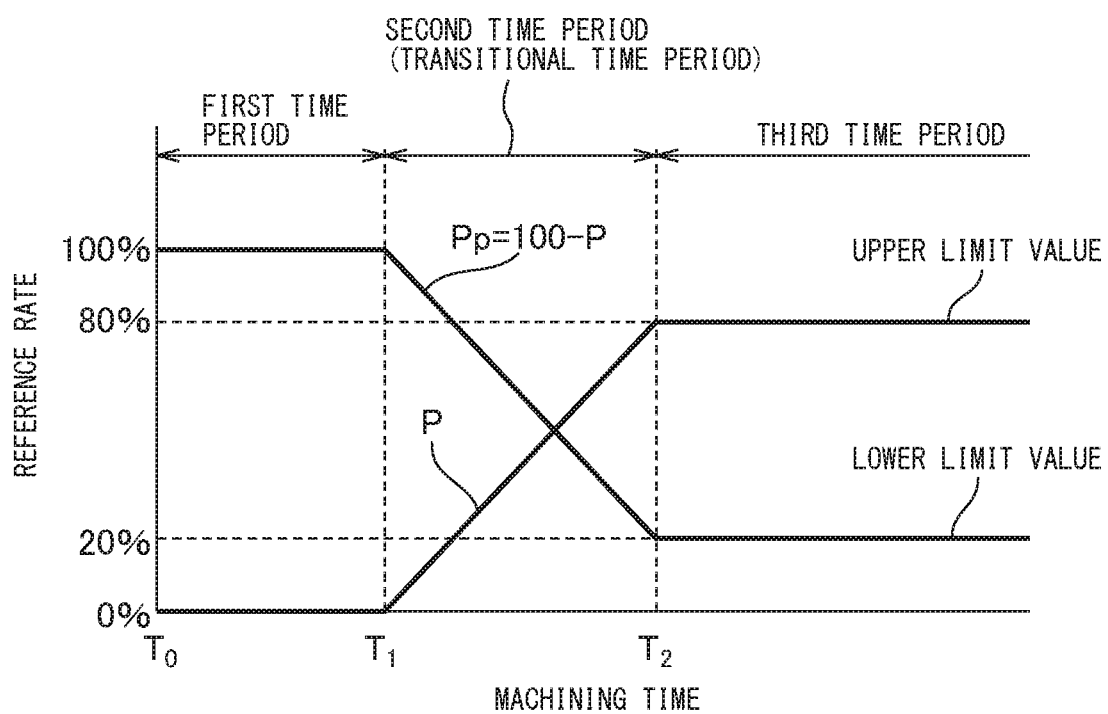
FIG. 2 is an example of a graph of reference rates utilized in the method of estimation.

In the method of estimation according to the first embodiment, the reference rate is defined as a function of time. As the machining progresses, the predicted machining speed Vp reference rate falls and therefore the actual machining speed Va reference rate increases. FIG. 2 is a graph showing such reference rates (hereinafter also referred to as "reference rate functions"), in which the actual machining speed Va reference rate is represented by P, and the predicted machining speed Vp reference rate is represented by Pp. As shown in FIG. 2, in the reference rates, in a first time period starting simultaneously with the start of machining, the predicted machining speed Vp reference rate is constant at 100% while the actual machining speed Va reference rate is constant at 0%. When the time $T_1$ elapses from the start of machining, a second time period is started. The second time period is also called the "transitional time period", while the time $T_1$ is also called the "transitional time period start time $T_1$" in this Description. In the transitional time period, the predicted machining speed Vp reference rate falls linearly from 100% to the lower limit reference rate of 20%, while the actual machining speed Va reference rate increases from 0% to the upper limit reference rate of 80%. When the time $T_2$ elapses, a third time period starts. In the third time period, the reference rate is maintained constant at the lower limit reference rate or upper limit reference rate. The time $T_2$ is also called the "transitional time period end time $T_2$" in this Description.

In FIG. 2, the upper limit reference rate is shown as 80% and the lower limit reference rate is shown as 20%, but these may be set to various values corresponding to the machining conditions such as 100% and 0%, respectively. Further, the lengths of the time periods of the first time period to third time period may be set to various values in accordance with the machining conditions etc. In particular, the length of the first time period may also be made zero. In that case, the transitional time period starts right after the start of machining.

The transitional time period start time $T_1$ and the transitional time period end time $T_2$ and the upper limit and lower limit reference rates in the graph of the reference rates of FIG. 2 are usually set by the operator of the wire electrical discharge machine etc. inputting them into the control device. However, these may also be provided as a set with the machining conditions and stored in the control device.

In the first embodiment, the reference rates are determined as functions of time, but a modification of the present embodiment where the reference rates are determined as functions of the machining circumferential length is also possible. This is because determining the reference rates based on the machining circumferential length rather than the machining time sometimes result in a rise in precision of the obtained remaining machining time Tr. In this case, the first to third time periods are read as the "first to third sections".

In the method of estimation according to the present embodiment, the machining times are counted individually for the first to third machining operations with the different machining conditions. Therefore, the start of the machining in the explanation of FIG. 2 means the starts of machining in the first to third machining operations. Further, the reference rate functions applied to the first to third machining operations may be different from each other or may be the same.

In the method of estimation according to the present embodiment, the remaining machining time Tr is calculated for each of the first to third machining operations. By the results of calculation being cumulatively added, the remaining machining time Tr of a single workpiece 200 is calculated.

In the example shown in FIG. 1 and Table 1, the machining proceeds up to the middle of the second machining after the end of the first machining of the left machining part 201. Therefore, the first machining is suspended and the count of the actual machining time Ta is also suspended, but the operation proceeds to the third time period. In the example of Table 1, the upper limit reference rate of the actual machining speed Va of the third time period of the first machining is set to 100%, while the remaining machining time Tr of the first machining is calculated from the estimated machining speed Ve equal to the actual machining speed Va and the remaining machining circumferential length Lr. Further, the second machining proceeds to the transitional time period, while the actual machining speed Va reference rate changes to about 40%. The remaining machining time Tr of the second machining is calculated from the estimated machining speed Ve calculated from the actual machining speed Va reference rate of about 40% and the predicted machining speed Vp reference rate of about 60% and the remaining machining circumferential length Lr. The third machining has not yet started, so the remaining machining time Tr is calculated from the estimated machining speed Ve equal to the predicted machining speed Vp and the remaining machining circumferential length Lr.

When the machining proceeds from the state of FIG. 1 and Table 1, the third machining of the left machining part 201 ends, and the first machining of the center machining part 202 starts, the count of the actual machining time Ta of the first machining is restarted. The first machining has already advanced to the third time period when machining the left machining part 201, so the reference rates in the third time period are applied as the reference rates at the time of machining the center machining part 202 (and the right machining part 203).

According to the method of estimation according to the first embodiment, the estimated machining speed Ve is determined from just the predicted machining speed Vp at the stage of the initial period of machining when the machining is not stable, while is determined while lowering the predicted machining speed Vp reference rate and raising the actual machining speed Va reference rate along with the progress in the machining, so it is possible to obtain a high precision estimated value of the remaining machining time Tr at any stage in the progression of machining.

Further, according to the method of estimation according to the present embodiment, the remaining machining time Tr of one workpiece 200 is calculated by cumulatively adding the remaining machining times Tr calculated for the different stages of the plurality of stages of machining, so even when machining of a single workpiece 200 includes a plurality of stages of machining with different machining conditions, it becomes possible to calculate the remaining machining time Tr with a high precision compared with the conventional method of using just the actual machining speed.

Figure 3:
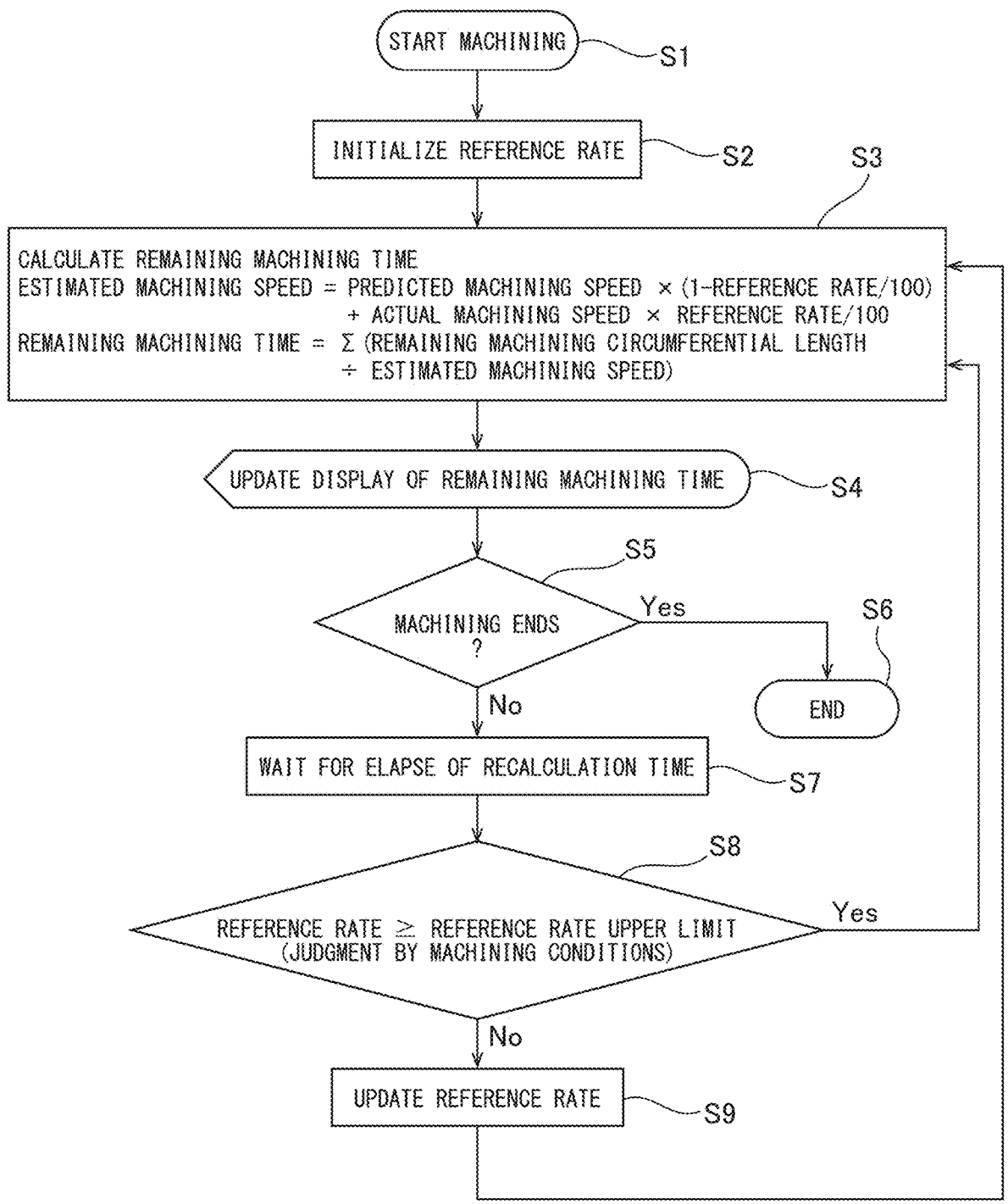
FIG. 3 is a flow chart showing one example of control performed by the method of estimation.

Next, referring to the flow chart of FIG. 3 showing one example of the control performed by the method of estimating the machining time according to the present embodiment, the method of estimation of the present embodiment will be further explained. This figure shows one example of the control after machining has been started. Further, for the reference rate functions applied in this flow chart, there is no first time period in FIG. 2. The transitional time period starts right after the start of machining.

First, at step S2, the reference rate is initialized. Next, at step S3, the remaining machining time Tr is calculated from the estimated machining speed Ve calculated based on the reference rate determined by the time from the start of machining and the remaining machining circumferential length Lr. The remaining machining time Tr is calculated and cumulatively added for each of the machining conditions, that is, for the first to third machining operations.

At step S4, the display is updated to the latest remaining machining time Tr. At the next step S5, it is judged if the machining has ended. If judging that the machining is ended, the routine proceeds to step S6 then ends. If judging that it is not ended, the routine proceeds to step S7 where the elapse of the recalculation time is awaited. Further, at step S8 as well, the judgment is made for each of the machining conditions, that is, for each of the first to third machining operations, and the advancing paths are individually determined.

At step S8, it is judged if the reference rate is the upper limit reference rate or more. If the upper limit reference rate or more, the routine returns to step S3, while if less than the upper limit reference rate, it proceeds to step S9. Note that the reference rate shown at step S8 of FIG. 3 is the actual machining speed Va reference rate. Further, at step S8 as well, the judgment is made for each of the machining conditions, that is, for each of the first to third machining operations, and the advancing paths are individually determined.

Next, the method of estimation of the wire electrical discharge machine according to a second embodiment of the present invention will be explained below. In the first embodiment, the tilt in the transitional time period of the graph of FIG. 2 (below, referred to as the "section change rate") is constant, but in the second embodiment, it is automatically adjusted in accordance with the stability of machining. The machine is programmed so that the tilt is easy when it is deemed that the machining is not stable and to become sharp when it is deemed that the machining is stable.

Figure 4:
FIG. 4 is a schematic view for explaining an elapsed time Tn and an immediately preceding machining time $\Delta\omega$ etc.

To judge the stability of machining, in the second embodiment, the machining speed fluctuation rate Vf is used. The machining speed fluctuation rate Vf is for example expressed by the following formula:

$$Vf = |(V_n - V_{n-1})/V_n|$$

where, in the formula, $V_n$ is the average machining speed $V_n$ of the immediately preceding machining time $\Delta\omega$ at the elapsed time $T_n$ from the start of machining $T_0$. Further, $V_{n-1}$ is the average machining speed of the immediately preceding machining time $\Delta\omega$ at the elapsed time $T_{n-1} = T_n - \Delta t$ from the start of machining $T_0$ (see FIG. 4). Further, for example, the length of the transitional time period is adjusted so that when the machining speed fluctuation rate Vf is 0.1 or less, the section change rate becomes two times the default value, when the fluctuation rate is 0.1 to 0.5, the change rate becomes 1 time the default value, and when the fluctuation rate is 0.5 or more, the change rate becomes 0.5 time the default value.

The method of estimation of the second embodiment basically has the flow of control shown in the flow chart of FIG. 3, but it differs from the case of the first embodiment at step S9 in that the reference rate is updated after performing the calculations for adjusting the section change rate.

In the second embodiment, the stability of machining is judged based on the rate of fluctuation of the machining speed, but this can be judged by various methods. For example, an embodiment in which this is judged based on the ratio of change of the number of discharges or the ratio of change of the average voltage between electrodes is also possible.

Figure 5:
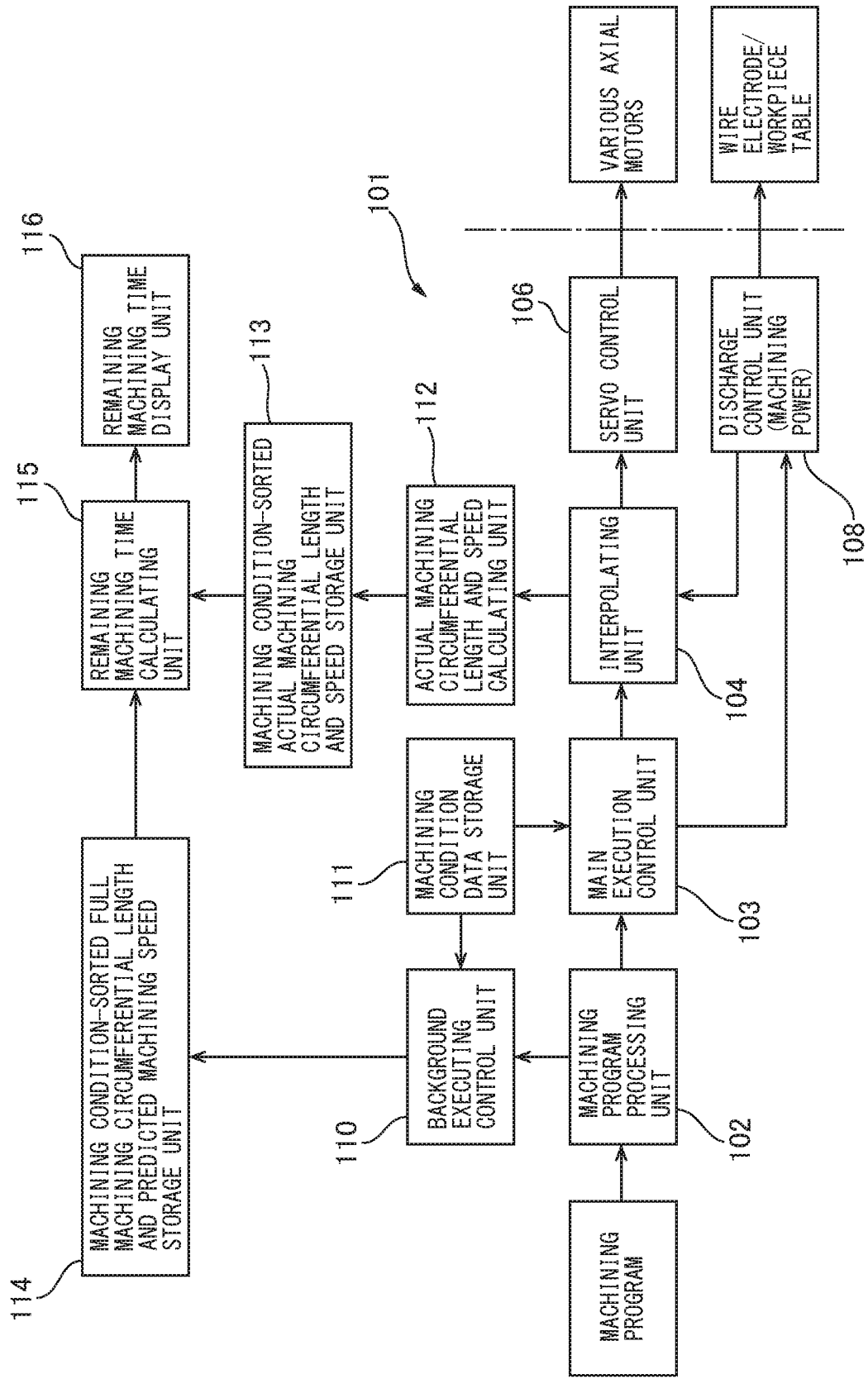
FIG. 5 is a block diagram schematically showing the configuration of a control device of a wire electrical discharge machine according to an embodiment of the present invention.

Next, an embodiment of a control device 101 of a wire electrical discharge machine able to perform the above-mentioned method of estimation will be explained with reference to FIG. 5. FIG. 5 is a block diagram showing an outline of the control device 101. This control device 101 comprises, as main units, a machining program processing unit 102, main execution control unit 103, interpolating unit 104, background execution control unit 110, actual machining circumferential length and speed calculating unit 112, remaining machining time calculating unit 115, and remaining machining time display unit 116. Below, the functions of these units will be explained.

The machining program processing unit 102 analyzes the machining program and calculates the wire movement path upon startup of a program. If running a program such as drawing a graphic in the background, the movement path data found by calculation is sent out to the background execution control unit 110. In actual machining, the movement path data is sent out to the main execution control unit 103.

The main execution control unit 103 successively sends out the wire movement path processed by the machining program processing unit 102 to the interpolating unit 104. At this time, it reads out the data of the machining conditions designated by the operator from the machining condition data storage unit 111 and sends it out to the interpolating unit 104 together with a command machining speed.

The interpolating unit 104 refers to the feedback data from the discharge control unit 108 while sending an axial movement command to the servo amplifier unit 106 so that the speed becomes close to the command machining speed.

When drawing a graphic etc. in the background, the background execution control unit 110 receives the wire movement path data from the machining program processing unit 102 and draws the movement path etc., reads out the predicted machining speed Vp from the machining condition data storage unit 111 in accordance with the machining condition command included in the machining program processing unit 102, and stores the machining circumferential length for each machining condition command and predicted machining speed Vp in a machining condition-sorted full machining circumferential length and predicted machining speed storage unit 114. That is, it is a control unit which executes these by internal processing without accompanying movement of the feed shaft.

The actual machining circumferential length and speed calculating unit 112 reads out the data by the interpolating unit 104 every certain time period, calculates the actual machining circumferential length La and the actual machining speed Va, and stores the same in a machining condition-sorted actual machining circumferential length and speed storage unit 113.

The remaining machining time calculating unit 115 periodically reads out data from the machining condition-sorted actual machining circumferential length and speed storage unit 113 and machining condition-sorted full machining circumferential length and predicted machining speed storage unit 114, determines the estimated machining speed Ve by the above-mentioned method, then calculates the remaining machining time Tr, and sends it to the remaining machining time display unit 116. The remaining machining time display unit 116 displays the received remaining machining time Tr.

In the present embodiment, the estimated machining speed is determined so that the predicted machining speed reference rate and the actual machining speed reference rate became respective predetermined values and the remaining machining time is calculated based on this estimated machining speed. The present invention is not limited to determining the estimated machining speed. For example, it includes averaging the remaining machining time found using just the predicted machining speed and the remaining machining time found using only the actual machining speed by a predetermined ratio to calculate the remaining machining time and other modifications.

The invention claimed is:

1. A method for estimating a machining time of a wire electrical discharge machine which estimates a remaining machining time while machining a workpiece, the method comprising steps of:
   setting a predicted machining speed;
   finding an actual machining speed;
   determining an estimated machining speed so that a ratio of referring to the predicted machining speed, defined as a predicted machining speed reference rate, and a ratio of referring to the actual machining speed, defined as an actual machining speed reference rate, respectively become predetermined values, wherein the predicted machining speed reference rate falls along with progression of the machining and the actual machining speed reference rate increases along with progression of the machining; and
   calculating the remaining machining time from the estimated machining speed,
   wherein the remaining machining time at each instant is estimated by repeatedly executing the process from the step of finding the actual machining speed to the step of calculating the remaining machining time.

2. The method according to claim 1, wherein,
in the step of determining the estimated machining speed performed when machining is proceeding in a first predetermined time period right after a start of machining or in a first predetermined section of the workpiece, the predicted machining speed reference rate is made 100%,
in the step of determining the estimated machining speed performed when machining is proceeding in a second predetermined time period after an elapse of the first predetermined time period or in a second predetermined section after the first predetermined section is passed, the predicted machining speed reference rate is gradually lowered and the actual machining speed reference rate is gradually raised in accordance with progression of the machining, and,
in the step of determining the estimated machining speed performed when machining is proceeding in a third predetermined time period after an elapse of the second predetermined time period or in a third predetermined section after the second predetermined section is passed, a predetermined lower limit reference rate is applied for the predicted machining speed reference rate and a predetermined upper limit reference rate is applied for the actual machining speed reference rate.

3. The method according to claim 2, further comprising a step of adjusting a length of the second predetermined time period or the second predetermined section to become shorter than a set length when a machining stability is high and to become longer than a set length when a machining stability is low.

4. The method according to claim 1, further comprising estimating the remaining machining time during each of a plurality of stages of machining corresponding to a plurality of types of machining conditions, wherein all of the steps are performed for each of the plurality of stages of machining,
the method further comprising a step of cumulatively adding the remaining machining times of the plurality of stages of machining calculated in the step of calculating the remaining machining time.

5. The method according to claim 1, wherein in the step of finding the actual machining speed, the actual machining speed is continuously found and, in the step of calculating the remaining machining time, the latest actual machining speed is used.

6. A control device of a wire electrical discharge machine for estimating a remaining machining time while machining a workpiece, the control device comprising a non-transitory storage medium having software program stored there on, the software program including instructions to:
calculate an actual machining speed;
determine an estimated machining speed so that a ratio of referring to a predetermined predicted machining speed, defined as a predicted machining speed reference rate, and a ratio of referring to an actual machining speed calculated at the actual machining speed calculating unit, defined as an actual machining speed reference rate, respectively become predetermined values;
calculate the remaining machining time from the estimated machining speed, wherein the predicted machining speed reference rate falls along with progression of the machining and the actual machining speed reference rate increases along with progression of the machining; and
to display on a display the calculated remaining machining time updated every instant.

* * * * *